United States Patent [19]

Finlay

[11] Patent Number: 5,078,608
[45] Date of Patent: Jan. 7, 1992

[54] TRAINING AID FOR FORK LIFT TRUCKS

[76] Inventor: Douglas E. Finlay, 4024 Teakwood Dr., Mississauga, Ontario, Canada, L5L 1J9

[21] Appl. No.: 642,885

[22] Filed: Jan. 18, 1991

Related U.S. Application Data

[63] Continuation-in-part of Ser. No. 383,063, Aug. 30, 1989, abandoned, which is a continuation of Ser. No. 172,768, Mar. 28, 1988, abandoned.

[30] Foreign Application Priority Data

Oct. 2, 1987 [CA] Canada ................... 548538

[51] Int. Cl.$^5$ ............................... A63H 33/00
[52] U.S. Cl. ................................... 434/219
[58] Field of Search .............. 434/62, 63, 219, 300, 434/302, 305, 32; 446/425

[56] References Cited

U.S. PATENT DOCUMENTS 3,691,681  9/1972  Gagnon ..................... 446/425

FOREIGN PATENT DOCUMENTS

| 163383 | 6/1949 | Austria | 434/302 |
| 939976 | 3/1956 | Fed. Rep. of Germany | 446/425 |
| 1354012 | 1/1964 | France | 434/63 |
| 199503 | 11/1938 | Switzerland | 434/300 |
| 957251 | 7/1982 | U.S.S.R. | 434/300 |

Primary Examiner—Richard J. Apley
Assistant Examiner—Glenn B. Richman
Attorney, Agent, or Firm—Donald E. Hewson

[57] ABSTRACT

A realistic situation simulator kit for classroom training of fork lift operators includes a mechanized fork lift model incorporating a reversible drive motor, a hoist drive, and including a cord-connected remote control. Manual adjustment of fork inclination also is provided. The kit also includes scaled loads and variable ramp means, together with a lurch-inducing surface obstacle, to enable simulation of real-life operating conditions, so as to illustrate the outcome of adopting sound and unsound operating practices and techniques.

8 Claims, 2 Drawing Sheets

TRAINING AID FOR FORK LIFT TRUCKS

FIELD OF THE INVENTION

This application is a Continuation-In-Part of application Ser. No. 07/383,063 file Aug. 30, 1989, now abandoned; which is a continuing application of application Ser. No. 07/172,768 file Mar. 28, 1988 now abandoned.

This invention is directed to a portable training aid and in particular to a training aid for training of fork lift truck operators in safe and unsafe practices of machine operation.

BACKGROUND OF THE INVENTION

In the training of driver operators for fork lift trucks, in addition to actual driving and machine operating instructions, either upon simulators or on the actual machines, it also has been found markedly beneficial to teach trainees, and to refresh the memories of operators, with regard to unsafe practices. The heavy, unstable and potentially dangerous nature of the machine precludes actual use thereof in an unsafe manner for purposes of demonstration or practice. Furthermore, due to the slow rate of load disposition on a real machine, the actual carrying out of safe and unsafe practice measures are not favorably "put over" to a group of trainees, due to the undue time delays involved in giving one-on-one instruction, with consequent loss of attention, and ensuing boredom. Furthermore, with a group of trainees, the desirable hands-on aspect is more effectively achieved by way of a model, due to the avoidance of delays, reduction in time for maneuver performance, and the competitive stimulus to out-perform other members in a peer group. This can be readily indulged, using a model, but would be unsuly hazardous and potentially life threatening in real life situations.

The acceptance of a simulator is significantly affected by the professionalism of presentation. Anything associated with a model, its method of use, or auxiliary components provided therewith that smacks of improvisation, is regarded as being of little consequence (i.e., improvised and inept), and can induce a condescending or contemptuous attitude in some group members. Such an attitude can detract to a very marked degree from the effectiveness of delivery of what, from the safety aspects thereof, constitutes a very important subject matter.

Furthermore, the mode of transportation of a simulator and the formalized presentation thereof as an organized kit conveys a decided and favorable initial impression on the trainee recipients.

The use of training simulators has a long history. One of the historically famous simulators was the LINK (TM) trainer in which a flight trainee could carry out virtually all aircraft maneuvers (except inverted flight and loops) while still safely on the ground. Examples of other simulated models are found in the following listed U.S. Pat. Nos.:

U.S. Pat. No. 2,797,922 - July 1957 - THOMPSON et al ARTICULATED TRUCK AND PLATFORM U.S. Pat. No. 2,584,113 - February 1952 - BUTLER REMOTE CONTROLLED MODEL AIRCRAFT U.S. Pat. No. 1,961,957 - June 1934 - BOCK CONVERTIBLE PLAY BOX RAMP CONSTRUCTION U.S. Pat. No. 3,119,611 - January 1964 - BENNETT REMOTE CONTROLLED TOY HELICOPTER U.S. Pat. No. 4,425,097 - January 1984 - OWENS HEAVY EQUIPMENT INSTRUMENT SIMULATION U.S. Pat. No. 4,386,914 - June 1983 - DUSTMAN AIRCRAFT CONTROLS SIMULATOR U.S. Pat. No. 3,772,825 - November 1973 - GAGNON REMOTELY CONTROLLED TOY BULLDOZER U.S. Pat. No. 3,747,265 - July 1973 - GAGON REMOTELY CONTROLLED TOY BULLDOZER

SUMMARY OF THE INVENTION

The present invention provides a hand portable training kit for training operators and would-be operators of fork lift trucks in the matters of safe practice relating to the operation of such vehicles. However, in addition to utilizing a model fork lift truck for simulation purposes, in combination with a readily adjustable collapsible ramp by which to simulate operating totter, whereby the fundamental limitation in balance aspects as related to the carrying out of safe and unsafe fork lift truck practice can more graphically and dramatically be illustrated, by analogy.

The invention comprises, in combination, a remote controlled electrical model fork lift truck having a mast, lift forks associated with said mast, a first reversible drive motor for propelling the truck forwardly and rearwardly, a second reversible drive motor for raising and lowering said lift forks along said mast of the truck, and control means for electively controlling the model, together with a modular balance ramp having a fulcrum and movable weights for use with the ramp.

The first reversible motor is operable to change the forward and rearward position of said model with respect to the balance ramp.

The second reversible motor is operable independently of the first reversible motor to affect the front-to-rear balance of the model by raising and lowering said lift forks with a weight placed thereon.

The balance ramp is mountable on the said fulcrum, and the model is movable on the balance ramp.

The operation of the model in a balanced and an unbalanced condition is demonstrable using the movable weights in combination with the balance ramp to alter the balance thereof in simulation of potential loading problems, and to simulate safe and unsafe operation practice of a fork lift truck using the model.

The characterization of the simulator is further enhanced by the provision of a plumb line attachment, to convert the our-of-level aspect of the teeter-totter cum ramp to a graphically similar, simple simulation or analogy of a fork lift truck with mast extension, by attachment of the plumb line from in upstanding normal relation to the teeter-totter. The plumb line embodiment may further be made of severely rectangular form, to further simulate the appearance of the machine mast.

The subject ramp is thus provided with a removable upwardly extending frame, as an analogous simulation of the extended mast of the model, being located at sensibly the pivot point of the ramp, so as to more closely represent the relationship of the fork lift mast to its pivot point,—namely the lower point of contact of the front wheels with the support surface. The frame further is provided with a plumb line so as to visually demonstrate the effects of machine inclinations, in terms of forward and rearward displacements of load center of gravity as the forward or rearward attitude of the mast is changed.

The present invention thus provides a model simulating a fork lift truck, having a remote electrical controller therefor, to electively drive the truck forward or backward, and to electively raise and lower fork lift portions thereof. The model is further provided with an adjustable mast so that the angle of inclination of the mast and the attached forks can be selectively adjusted. A simple, robust electrical remote control is provided for controlling the two elective motional functions, by simple on-off switch or bang-bang controls.

The invention further provides a variable ramp for use in combination with the subject model, to illustrate, both directly and by analogy, realistically simulated operational situations.

The present invention thus includes a method of utilizing a model fork lift truck to teach safe operation of a like real machine, the model having a pair of lifting forks raisably mounted upon a tiltable mast; including, utilizing a manually loaded pivoted beam balance to demonstrate a point-of-balance condition between a fixed position load and a variable to simulate the condition of the model, and operating the model in a like fashion to demonstrate factors creating an unsafe operating condition for the machine.

BRIEF DESCRIPTION OF THE DRAWINGS

Certain embodiments of the invention are described, reference being made to the accompanying drawings, wherein.

DETAILED DESCRIPTION OF THE INVENTION

Figure 1:
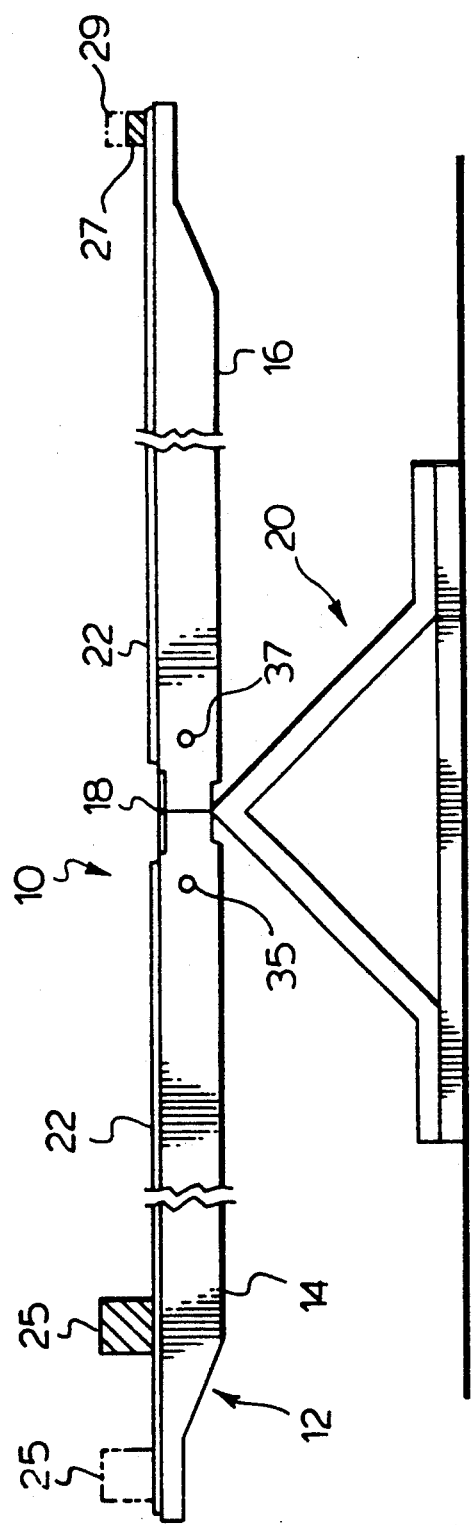
FIG. 1 shows the simple component parts of the ramp, in assembled relation as an analogous balance system.

Referring to FIG. 1, a balance (or teeter-totter) arrangement 10 has a foldable ramp 12 comprising ramp halves 14, 16 secured by a hinge 18 and supported on a triangulated fulcrum means 20.

A friction layer 22 secured to the upper surface of ramp halves 14, 16 precludes untoward, unrealistic skidding or sliding of the model of the weights 25, 27, 29 upon the ramp functional surface.

The major weight 25 is illustrated as being balanced in an intermediate position (solid lined) by a lesser weight 27 (solid line), positioned at the end limit of the ramp portion 16.

In a second, position of weight 25 (shown in phantom), it is shown how the second position thereof is required to balance the increased, which now comprises weight 27 plus weight 29 (shown in phantom), to graphically demonstrate the effects of moment arms to overcome load increases.

Figure 3:
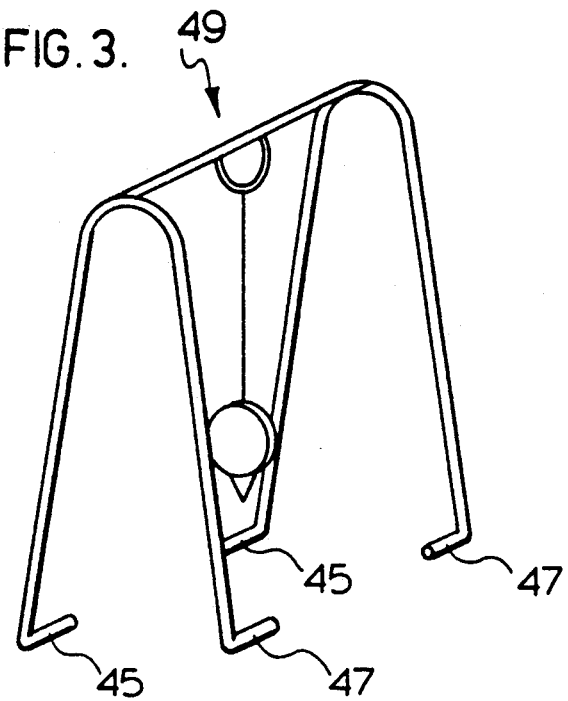
FIG. 3 shows a general view of the plumb line attachment.

FIG. 3 shows a plumb line 49 to be used in conjunction with the ramp 12. Recesses 35, 37, one located in each half 14, 16 of ramp 12, receive pins 45, 47 that secure plumb line 49 to ramp 12.

Figure 2:
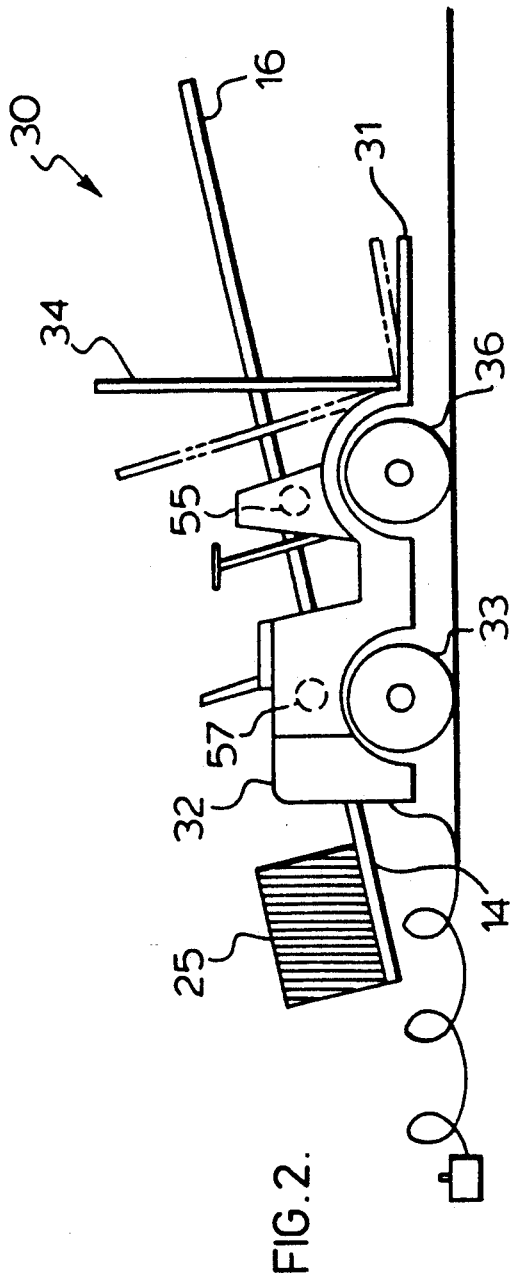
FIG. 2 shows the model machine arranged in analogy emphasizing position in front of the balance/ramp.

In FIG. 2 the model 30 is arranged in particular analogous relation to the teeter-tottered ramp 12 and major weight 25, to equate the major weight 25 at the limit of its moment arm position, with the ballast weight portion 32 of the model 30, in its fixed optimum condition. The position of the fork lift front wheels 36 in coincidence with the fulcrum of center point of hinge 18 emphasizes the role of a fork lift truck as a balance mechanism, wherein, in the extreme, the machine as represented by model 30 can teeter about the fulcrum provided by its front wheels 36.

Figure 4:
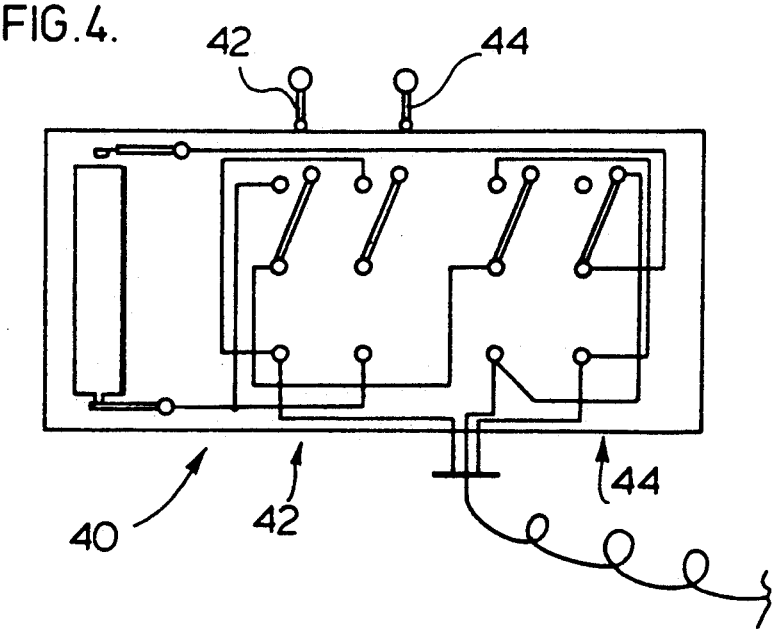
FIG. 4 shows the bang-bang control circuit for the subject model.

Referring to FIG. 4, the controller 40 is illustrated as being battery powdered. It could, alternatively or additionally be powered by a power pack equivalent to the batteries. Control of the respective lift motor (shown in phantom at 55) or propulsion drive motor (shown in phantom at 57) is bang-bang—i.e., either of or off.

The use of double pole double throw center biased switches 42, 44 for the respective lift or lower function, and the go forward, go backward function, represented in the figure both schematically and electrically, permits individual operation of each motor forwardly or in reverse, by bang-bang (on-off) operation.

In addition to the electrical controls, a further degree of simulation is provided to the mode 30 by a hand-settable angular positioning of the mast 34 in upright or in backward canted relation, with consequent change to the forks 31, from the illustrated pick-up position shown in FIG. 2, to the canted rearwardly inclined "safety" position shown chain dotted.

In use, the model 30 is loaded with one of the loads 25, positioned in a forward position on forks 31, and with the forks 31 in the forward, lower, pick-up position. The mass of load 25 is selected as the maximum safe load for the model 30, as to nearly raise the rear, steering wheels 33 off the "ground".

In this position of near balance, propulsion of the model over an irregularity, such as a pencil, can upset the precarious equilibrium, causing the rear, steering wheels 33 to raise off the support surface, as they would in real life with dangerous consequences. The stability advantage afforded by operating the machine with the forks in the raised position can then be readily analogously and graphically demonstrated.

The plumb line 49 can be used to simulate operation of the vehicle having the forks 31 in a raised position, and the load correspondingly elevated. The plumb line 49 comprises a weight suspended on a string or the like from a frame 11, the frame 11 having pins 45, 47 when the ramp 12 is level, fitted into recesses 35, 37 of the ramp 12 the weight of the plumb line 49 is suspended from a suspension point vertically above the fulcrum 20 when the beam is in balance. When the balance of the ramp 12 is altered with respect to the fulcrum 20, the weight of the plumb line 49 will not be vertically above the fulcrum but will be over one half 14 of the other half 16 of the ramp to have its own effect on the balance. The use of the plumb line may illustrate that elevated load of a fork lift truck may comparably affect the balance of the trucks.

When the model 30 is used on the balance ramp, the balance ramp 12 may be put in a level position so as to simulate the operating conditions of a level floor. Further, the balance ramp 12 may be tilted in either direction at a desired angle with the model 30 thereon, thus simulating the operating conditions of a incline or a decline. The model 30 may, of course, remain on the ramp 12, when the ramp 12 is at any angle. While the model 30 is on the ramp 12, the plumb line 49 shows the line of action of the weight of any load 25 that might be on the forks 31 of the model 30. If the load 30 is positioned such that plumb line 49 passes through the center of gravity of the load 30 on the forks 31, then the plumb line 49 can indicate directly whether the weight of the load on the forks 31 has put the model 30 in an unbalanced condition and by how much. If the plumb line 49 passes outside of the safe operating range, in terms of the distance along the forks 31, this can be seen very directly. Further, the effects of a change in the angle of inclination of a fork lift truck on the balance condition of the truck can be observed directly by changing the angle of inclination of the ramp, with the model thereon.

Using the subject model, in conjunction with the ramp/balance, it is possible not only to demonstrate correct and principles that govern the occurrences of lift trucks, but, equally importantly, the unsafe machine operation, to thus provide deeper understanding to the participants. Use of the term "bang-bang", as set forth herein, is one which is common to certain parts of the industry. A usual practical embodiment would be a single-shot multivibrator—whose control is selectively devised in the manner shown herein.

Other modifications and alterations may be used in the design and manufacture of the training aid for fork lift trucks of the present invention without departing from the spirit and scope of the accompanying claims.

I claim:

1. In combination, a remote controlled electrical model fork lift truck having a mast, lift forks associated with said mast, a first reversible drive motor for propelling the truck forwardly and rearwardly, a second reversible drive motor for raising and lowering sad lift forks along said mast of the truck, and control means for electively controlling the model, together with a modular balance ramp having a fulcrum and movable weights for use with said ramp;

said first reversible motor being operable to change the forward and rearward position of said model with respect to said balance ramp;

said second reversible motor being operable independently of said first reversible motor to affect the front-to-rear balance of said model by raising and lowering said lift forks with a weight placed thereon;

said balance ramp being mountable on said fulcrum, and said model being movable on said balance ramp; and whereby operation of said model in a balanced and an unbalanced condition is demonstrable using said movable weights in combination with said balance ramp to alter the balance thereof in simulation of potential loading problems, and to simulate safe and unsafe operation practice of a fork lift truck using said model.

2. The combination as set forth in claim 1, including means for varying the angle of said mast carrying said lift forks.

3. The combination as set forth in claim 1, wherein said control means comprises switch means for selectively starting and stopping the operation of said motors.

4. The combination as set forth in claim 3, wherein said switch means comprises on-off switches, each having two switch positions; whereby a first position of each switch controls a respective reversible drive motor connected thereto in one, and a second position of each switch controls the respective reversible drive motor in a second direction.

5. The combination as set forth in claim 1, including a plumb line having a weight suspended from a frame, said frame being detachably secured to said balance ramp such that the weight hangs vertically above said fulcrum when the beam is in horizontal balance, to demonstrate visually the effect on the balance of the beam when said movable weights are moved so that the weight on said plumb line hangs to one side or the other side of said fulcrum to affect the beam balance when the beam is tilted, whereby to demonstrate a compatible effect of varying the angle of the mast of a fork lift truck.

6. The method of utilizing a model fork lift truck to teach safe operation of an actual fork lift truck, the model having a pair of lifting forks raisably mounted upon a tiltable mast; wherein a manually loaded pivotal beam balance joist is used to demonstrate a point-of-balance condition between a fixed position load and a variable position load mounted on opposite sides of a model when loaded in various fashions; comprising the steps of operating said model so as to create various dispositions of the load with respect to said fulcrum of the model, and thereby creating balance and out-of-balance conditions of said model.

7. The method as set forth in claim 6, including the step of operating said model when the load is disposed in an unsafe condition, using remote electrical controls therefor, and of varying the angle of the mast of said model to demonstrate changes in safety conditions effected thereby.

8. The method as set forth in claim 7, including the step of mounting a plumb line in secured relation with said beam balance, vertically above the beam fulcrum when the beam is in balance, and manipulating said beam balance to demonstrate the effect or balance of the plumb line load with varying angles or the plumb line to the beam and the relationship thereto of the angle of the mast.

* * * * *